United States Patent [19]
Godel, deceased

[11] 3,982,884
[45] Sept. 28, 1976

[54] FLUIDIZED BED SYSTEM

[75] Inventor: Albert Godel, deceased, late of Paris, France, by Yves Aubron, administrator

[73] Assignee: Fives-Cail Babcock, Paris, France

[22] Filed: Feb. 13, 1975

[21] Appl. No.: 549,697

[30] Foreign Application Priority Data
Feb. 14, 1974 France ............................ 74.04956

[52] U.S. Cl. ................................. 432/14; 34/57 C; 432/58
[51] Int. Cl.² ........................................ F27B 15/00
[58] Field of Search ................ 34/57 C; 432/14, 15, 432/58; 48/63, 76, 77

[56] References Cited
UNITED STATES PATENTS

| | | | |
|---|---|---|---|
| 1,832,092 | 11/1931 | Burnside | 48/63 |
| 2,716,598 | 8/1955 | Moses | 48/63 X |
| 2,776,879 | 1/1957 | Gamz | 48/63 X |
| 2,866,696 | 12/1958 | Godel | 48/76 X |

*Primary Examiner*—John J. Camby
*Attorney, Agent, or Firm*—Kurt Kelman

[57] ABSTRACT

A fluidized-bed system in which a main chamber and an auxiliary chamber communicate with each other through an opening in a common wall near the bottom of the main chamber. An endless traveling grate rises along the bottom of the main chamber and through the opening into the auxiliary chamber. Granular material is fed to the main chamber and fluidized to a first level by gas passing through apertures in the grate. The fluidized material flows through the common wall into the auxiliary chamber and is held to a lower second level there by a gas pressure higher than that in the disengaging space in the main chamber. The conveyor rises beyond the top of the bed in the auxiliary chamber and discharges lifted material from the auxiliary chamber into a water seal.

5 Claims, 3 Drawing Figures

FLUIDIZED BED SYSTEM

This invention relates to fluidized bed systems, and particularly to apparatus and a method for treating granular solid material in a fluidized bed.

It is known from U.S. Pat. No. 2,866,696 that coal in granular form may be burnt in a chamber in which the coal is kept in fluidized condition by the air of combustion. The ash formed tends to agglomerate, and the agglomerated particles find their way to the bottom of the fluid bed from which they are withdrawn by a traveling grate moving in an obliquely upward direction through the top surface of the bed. Because of the need for complete combustion of the coal, the fluid bed must be relatively shallow, thereby permitting the use of a grate of reasonable length and inclination.

This technique is not applicable where a reaction calls for a relatively deep bed as in the conversion of coal to a combustible gas or in the formation of clinkers for cement manufacture. Solid material agglomerating at the bottom of the deep bed must be removed at about the same rate at which it forms and accumulates at the bottom of the bed, but it cannot be removed through the surface of the bed because of the limitations on the slope and length of a traveling grate or other conveyor inherent in the depth of the bed and the horizontal dimensions of the apparatus.

This problem is solved, according to this invention by maintaining the top surfaces of two portions of a continuous fluidized bed at different respective levels. Agglomerates formed in the bottom portion of the bed are transferred to the shallower bed and discharged through the top surface of the same by an upwardly inclined conveyor.

The apparatus employed for carrying out the method described above includes a main chamber, an auxiliary chamber, and a conduit having a first orifice open toward the main chamber and a second orifice open toward the auxiliary chamber. Means are provided for feeding the granular material to be treated to the main chamber at a rate sufficient to maintain in the main chamber a first bed of the material extending upward beyond the first orifice of the conduit to a first level. A conveyor conveys material from the main chamber through the conduit into the auxiliary chamber. The conveyor lifts conveyed material in the auxiliary chamber to second level and discharges the lifted material outward of the auxiliary chamber at the second level. A second bed of granular material is thereby maintained in the auxiliary chamber and covers the second orifice, but the second level is lower than the first level. At least the first bed is kept in fluidized condition by gas admitted under pressure below the first level, whereby a predetermined gas pressure is maintained in the main chamber above the first level. The auxiliary chamber is sealed so as to maintain a gas pressure above the fluidized bed higher than the corresponding pressure in the main chamber and to balance the hydrostatic pressure due to the different levels of fluidized material in the two chambers.

Other features, additional objects, and many of the attendant advantages of this invention will readily be appreciated as the same becomes better understood from the following detailed description of a preferred embodiment of this invention and from consideration of the appended drawing in which.

Figure 1:
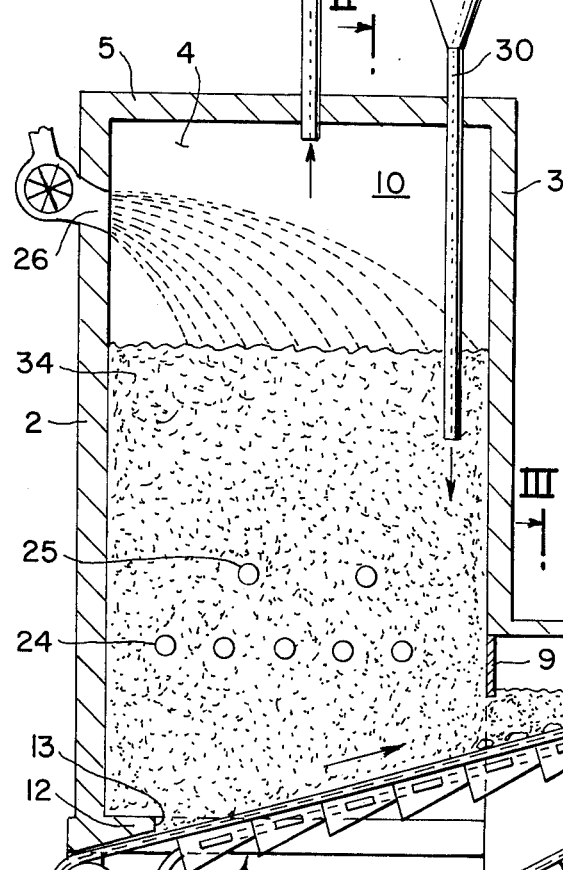
FIG. 1 shows a fluidized bed system of the invention in side-elevational section.

Referring now to the drawing in detail, and initially to FIG. 1, there is shown a gas-tight and heat-resistant structure having an upright front wall 2, an upright rear wall 3 and two side walls 4 connecting the front wall and rear wall. A cover 5 horizontally connects the walls. The walls 2, 3, 4 rest on a base 1. The rear wall 3 is formed with an opening 6 of vertically elongated, rectangular shape which extends downward to the base 1.

Figure 3:
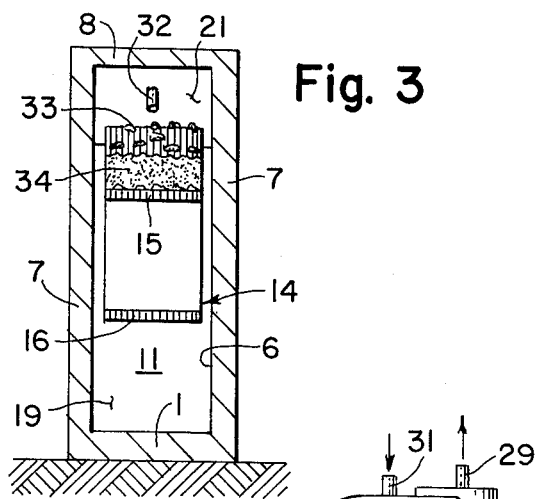
FIG. 3 is a sectional view of the same apparatus taken on the line III—III.
Figure 2:
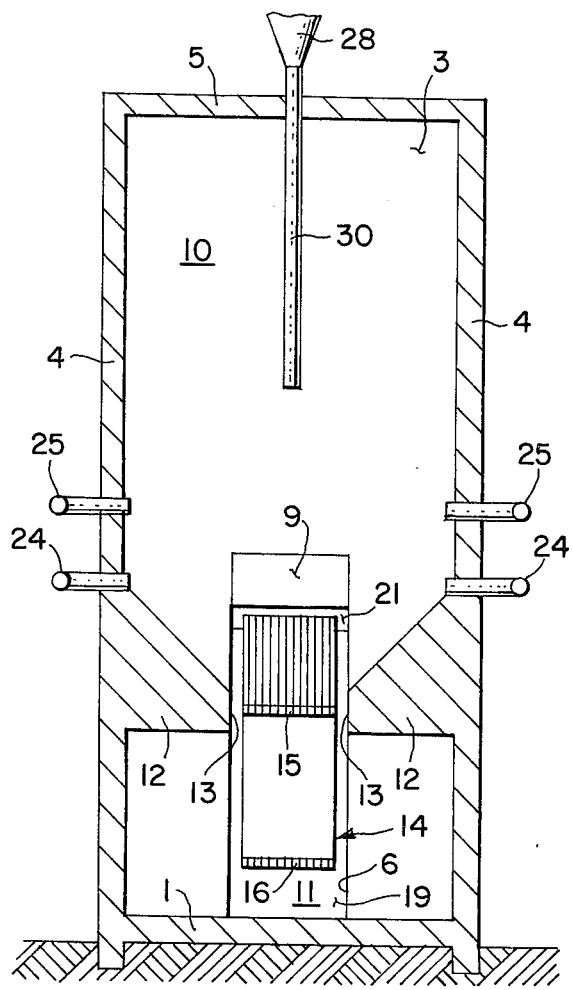
FIG. 2 illustrates the apparatus of FIG. 1 in elevational section on the line II—II in the empty condition.

As is better seen in FIG. 3, low side walls 7 flank the opening 6 beyond the rear wall 3. They are covered by a roof 8 much lower than the cover 5. The opening 6 is partly closed by a baffle plate 9 which reduces the height of the opening. The opening 9 connects a main chamber 10 between the walls 2, 3, 4 with an auxiliary chamber 11 partly bounded by the walls 7 and the roof 8, the two chambers having a common upright wall partly constituted by the baffle 9.

The walls of the chamber 10 taper downward toward a platform 12 formed with a slot 13 for passage of a conveyor 14 whose continuous belt is apertured so that its straight upper strand 15 forms a traveling grate downwardly bounding the chamber 10 while the lower strand 16 is slack. The conveyor is trained over a pulley 17 located below the platform 12 in a opening of the front wall 2 whereas the cooperating second pulley 18 is located high enough in the auxiliary chamber 11 to raise the conveyor strand 15 above the lower edge of the baffle 9. The pulley 18 is mounted on a wall 19 which connects the portions of the walls 7 below the pulley 18. The clearances between the conveyor belt and the walls 2, 12, 19 are too small to permit significant gas leakage along the belt.

A row 20 of pressure boxes is mounted below the conveyor strand 15 in the chambers 10,11 and is connected with a source of fluidizing gas, the boxes being open toward and sealed by the strand 15.

The space of the chamber 11 between the wall 19 and the rear wall 21 of the chamber contains a partition 22 to define a chute for agglomerated particles 33 discharged from the conveyor belt 15 as it travels over the pulley 18. The chute leads downward into a well 23 continually supplied with fresh water, as indicated by an arrow, the water covering the lower end of the chute.

Nozzles 24, 25 permit gaseous material to be admitted to the chamber 10 through openings in the walls 4, but may also supply granular solid material 34 entrained in a carrier gas. Additional particulate solid material may be admitted through an opening 26 in the front wall 2 adjacent the cover 5, the opening being provided with a star valve for controlling the feeding rate.

Gas produced by the interaction of the fluidizing gas and other gaseous reactants with the solid granular material is released from the chamber 10 through an exhaust pipe 27 leading to a dust separator represented in FIG. 1 by a single cyclone 28. The dust collected in the cyclone is returned by gravity to the chamber 10 through a dust return duct 30. A branch conduit 31, connected to the exhaust pipe 27, permits cold solid material to be introduced into the chamber 10 in countercurrent flow to the hot reaction gases for improved thermal efficiency of the apparatus.

A nozzle 32 is directed toward the strand 15 of the belt 14 in the auxiliary chamber 11 where the strand rises above the level of the fluidized bed. It permits granular material adhering to larger ash aggregates to be blown back into the fluidized bed before the material can drop into the chute and into the well 23.

The apparatus illustrated has been employed successfully for making water gas and producer gas from carbonaceous solid particles containing ash. Air at 100°–150°C was employed as the fluidizing gas supplied under pressure to the row 20 of pressure boxes. The gas passed upward through the fluidized mass in both chambers 10, 11 and its oxygen content was consumed by reaction with the carbonaceous particles which were further heated by air or oxygen-bearing system admitted at about 500°C through the nozzles 24. A mixture of nitrogen and combustible gas left the chamber 10 through the exhaust pipe 27, so that the gas pressure in the disengaging space above the fluidized bed in the chamber 10 was not much above atmospheric pressure.

Gas reaching the freeboard or disengaging space above the fluidized bed in the chamber 11 was prevented from escaping by the water seal in the well 23. When a steady state was reached, the gas pressure in the chamber 11 balanced the hydrostatic pressure due to the different levels of the top surfaces of the fluidized beds in the two chambers. For maintaining such a condition, the opening 6 must be covered by the fluidized material at all times. Excessive gas pressure in the chamber 11 is relieved when the level of the fluidized bed in the chamber 11 drops below the baffle 9 or through the water seal in the well 23. The feeding of granular material to the chamber 10 and the removal of such material to the chamber 11 by gravity flow and by the conveyor 14 must be controlled to maintain the necessary high bed level in the chamber 10.

As is known in itself, the agglomerates formed and discharged by the conveyor 14 consist practically entirely of ash which does not tend to adhere firmly to the starting material, and very little, if any, unreacted carbonaceous material is lost which the ash agglomerates.

While the invention has been described with specific reference to the production of combustible gases from coke, coal, or like carbonaceous material, the apparatus shown is utilized to advantage where granular material is to interact at elevated temperature with a gas in a fluidized bed. The production of clinkers for the cement industry being one example of such other utility for a process in which larger particles are agglomerated by heat and accumulate in the bottom portion of a fluidized bed.

An apertured belt or traveling grate which moves in a straight line through the main chamber and the auxiliary chamber to at least the level of the fluidized bed in the auxiliary chamber has been illustrated, is preferred at this time, but may be replaced by other conveying devices which can move particulate material from the main chamber through the short conduit provided by the opening 6 into the auxiliary chamber 11 and ultimately upward through the top surface of the fluidized bed in the latter chamber. If conditions permit, the conveyor may be upwardly inclined in the auxiliary chamber only. It is preferred that it constitute at least a major portion of the effective bottom wall in the main chamber and thus carry the weight of the fluidized bed, but arrangements in which pushers intermittently transfer agglomerated particles from the main chamber to the auxiliary chamber in a horizontal path may be employed if they cooperate with an inclined conveyor in the auxiliary chamber. A screw conveyor may replace the illustrated traveling grate in either chamber or in both if a conventional distributor is employed for admitting the fluidized gas.

It is necessary that the level of the fluidized bed in the auxiliary chamber 11 be at least as high as the lower edge of the baffle 9, but a somewhat higher level may be chosen by suitably positioning the pulley 18 and/or the baffle 9.

It should be understood, therefore, that the foregoing disclosure relates only to a preferred embodiment of the invention, and that it is intended to cover all changes and modifications in the example of the invention herein chosen for the purpose of the disclosure which do not constitute departures from the spirit and scope of the invention set forth in the appended claims.

What is claimed is:

1. Apparatus for treating a granular solid material comprising:
    a. a main chamber;
    b. an auxiliary chamber;
    c. a conduit having a first orifice open toward said main chamber and a second orifice open toward said auxiliary chamber;
    d. feeding means for feeding said material to said main chamber at a rate sufficient to maintain in said main chamber a first bed of said material extending upwardly beyond said first orifice to a first level and to maintain in said auxiliary chamber, via said conduit, a second bed of said material covering said second orifice;
    e. conveying means for conveying agglomerates of said material from said main chamber through said conduit into said auxiliary chamber,
        1. said conveying means including means for lifting conveyed agglomerates of said material in said auxiliary chamber to a second level, and for discharging the lifted material outward of said auxiliary chamber at said second level,
        2. said second level being lower than said first level;
    f. fluidizing means for keeping said first and second beds in fluidized condition and including means for admitting a gas under pressure to said main and auxiliary chambers beneath said beds, whereby a predetermined gas pressure is maintained in said main chamber above said first level; and
    g. sealing means for maintaining above said second bed in said auxiliary chamber a gas pressure greater than said predetermined pressure.

2. Apparatus as set forth in claim 1, wherein said conveying means include an endless, apertured belt having an upper strand, and means for moving said upper strand from said main chamber to said auxiliary chamber, said fluidizing means admitting said gas to said main chambers through apertures in said upper strand.

3. Apparatus as set forth in claim 2, wherein said moving means move said upper strand in said second chamber upwardly beyond said second level.

4. Apparatus as set forth in claim 2, wherein said upper strand downwardly bounds said chambers.

5. In a method of operating a fluidized bed system in which a bed of granular material is kept in the fluidized condition by a gas admitted to said bed, said particles are heated, and agglomerates larger than said particles are formed and accumulate in the bottom portion of said bed, the improvement which comprises:
a. separating said fluidized bed into a deep fluidized bed portion and a shallower fluidized bed portion, the two fluidized bed portions being in communication through a passage submerged in the bed;
b. maintaining said bed portions under hydrostatic pressure balance; and
c. conveying the accumulated agglomerates from said deep into said shallower bed portion through the submerged passage and through the surface of the shallower bed portion to a gas-tight outlet.

* * * * *